United States Patent [19]

De Grave et al.

[11] Patent Number: 5,045,256

[45] Date of Patent: Sep. 3, 1991

[54] EXPANSION OF SHRUNK FOAM PARTICLES OF PROPYLENE POLYMERS

[75] Inventors: Isidoor De Grave, Wachenheim; Udo Haardt, Biblis; Wolfram Koegel, Mannheim; Fritz E. Krueckau, Battenberg; Hermann Tatzel, Weinheim, all of Fed. Rep. of Germany

[73] Assignee: BASF Aktiengesellschaft, Ludwigshafen, Fed. Rep. of Germany

[21] Appl. No.: 549,164

[22] Filed: Jul. 6, 1990

[30] Foreign Application Priority Data

Jul. 6, 1989 [DE] Fed. Rep. of Germany ....... 3922207

[51] Int. Cl.$^5$ ............................................ B29C 67/20
[52] U.S. Cl. ...................................... 264/53; 264/321; 521/58; 521/142; 521/143; 521/918
[58] Field of Search .................... 264/321, 53; 521/58, 521/142, 143, 918

[56] References Cited

U.S. PATENT DOCUMENTS

| | | | |
|---|---|---|---|
| 3,725,320 | 4/1973 | Wang | 264/DIG. 15 |
| 4,631,159 | 12/1986 | Maeda et al. | 264/DIG. 15 |
| 4,698,191 | 10/1987 | Endo et al. | 264/DIG. 15 |
| 4,702,868 | 10/1987 | Pontiff et al. | 521/79 |
| 4,704,239 | 11/1987 | Yoshimura et al | 264/DIG. 15 |

Primary Examiner—Morton Foelak
Attorney, Agent, or Firm—Oblon, Spivak, McClelland, Maier & Neustadt

[57] ABSTRACT

Foam particles of propylene polymers which have shrunk from 40 to 95% of their original volume and have a bulk density of from 10 to 30 g/l can be expanded if they are treated with air or nitrogen under superatmospheric pressure, subsequently decompressed. If desired post-foamed by heating and, after aging, re-treated with air or nitrogen under superatmospheric pressure, subsequently decompressed and aged under atmospheric pressure until the pressure in the cells has dissipated.

2 Claims, No Drawings

EXPANSION OF SHRUNK FOAM PARTICLES OF PROPYLENE POLYMERS

Due to their heat resistance and excellent shock-absorbent properties, foams based on propylene polymers are of considerable industrial importance. They are prepared in a known manner by impregnating propylene polymers with a volatile blowing agent at elevated temperature and superatmospheric pressure and decompressing the mixture. The preferred procedure is to start from polymer particles which foam up to form foam particles. Moldings of any desired type can be produced by welding the foam particles. To this end, the foam particles are treated with a gas under superatmospheric pressure, so that the cells have an excess pressure and, on subsequent heating, the particles weld together in the mold and expand to fill the spaces. In another procedure, the foam particles are compressed by applying pressure and introduced into a mold under superatmospheric pressure, heated and subsequently decompressed, during which they weld together.

In the known processes, the blowing agents employed are chlorofluorocarbons. It is assumed that blowing agents of this type adversely affect the environment since they damage the ozone layer in the atmosphere.

It has also been proposed to use hydrocarbons as blowing agents.

In practice, however, it has become apparent that the gaseous hydrocarbon, for example butane, present in the cells in freshly prepared foam particles diffuses out of the cells more quickly than the ambient air diffuses into the cells. This results in a reduced pressure in the cells, which causes considerable shrinkage of the foam particles if the cell walls have inadequate strength. This is particularly true in the case of foam particles of low density.

It is an object of the present invention to restore the original volume of shrunk foam particles of propylene polymers and if possible to expand the particles further.

Surprisingly, we have found that this object is achieved in that taut foam particles are obtained if shrunk foam particles are treated with air or nitrogen under superatmospheric pressure and the particles are subsequently decompressed and aged under atmospheric pressure.

We have also found that shrunk foam particles can be expanded if they are treated with air or nitrogen under superatmospheric pressure, subsequently decompressed, briefly post-foamed by heating, re-shrunk by aging, again treated with air or nitrogen under superatmospheric pressure and subsequently decompressed and aged under atmospheric pressure The present invention thus relates to a process for expansion of foam particles of propylene polymers with a bulk density of from 10 to 30 g/l which have been prepared using $C_3$- to $C_5$-hydrocarbons as blowing agents and have been shrunk to from 40 to 95% of their original volume, which comprises treating the shrunk particles for a sufficient time at 20° C. or more below the softening point with air or nitrogen under a superatmospheric pressure of from 0.5 to 10 bar, subsequently decompressing the particles to atmospheric pressure, during which they regain their original volume, and aging the particles under atmospheric pressure until the pressure in the cells has fully dissipated.

Propylene polymers are polypropylene and copolymers with ethylene, 1-butene and other α-olefins which contain from 0.5 to 20 mol. %, preferably from 1 to 10 mol. %, of comonomers. Both random and block copolymers are suitable. The propylene polymers preferably have a melt flow index MFI (230° C., 2.16 kg) of from 2 to 12, measured in accordance with DIN 53 735.

The foam particles are prepared in a conventional manner by impregnating the propylene polymers, expediently in the form of particles having a mean diameter of from 0.5 to 5 mm, preferably from 0.6 to 2 mm, in aqueous suspension with from 0.1 to 0.4, preferably 0.15 to 0.3, kg per kg of polymer, of a $C_3$- to $C_5$-hydrocarbon, such as propane, butane, isobutane, n-pentane, isopentane and/or neopentane, at from about 5° C. to about 20° C. below the softening point of the polymer and under superatmospheric pressure, and subsequently decompressing the particles so that they foam up.

The foam particles generally have a mean diameter of from 3 to 15 mm.

The foam particles to be treated according to the present invention have a bulk density of from 10 to 30 g/l, corresponding to a density of the foam of from about 15 to 50 g/l. They are shrunk to from 40 to 95% of their original volume. The degree of shrinkage can easily be determined by subjecting the particles to a reduced pressure, whereupon they regain their original volume. However, they immediately shrink again if the pressure is returned to atmospheric.

In order to regenerate the original volume, the shrunk particles are generally treated at from room temperature (20° C.) to 20° C. or more, preferably 30° C. or more, below the softening point of the polymer, with air or nitrogen under a superatmospheric pressure of from 0.5 to 10 bar, in particular from 1 to 8 bar, for a sufficient time, in general from 5 to 500 minutes. The optimum time depends on the pressure and temperature and can easily be determined by preliminary experiments.

After the pressure treatment, the particles are decompressed to atmospheric pressure at which they are aged until the pressure in the cells has fully dissipated.

This treatment restores the original volume of the shrunk particles. Surprisingly, no significant shrinkage occurs during further storage after cooling.

However, it is also possible to expand the shrunk particles beyond their original volume. In this case, the pressure-treated particles are briefly heated, after decompression and while the excess pressure in the cells is still 0.25 bar or more, preferably from 0.3 to 3 bar, in particular 0.5 to 2.5 bar, to the softening point or up to 30° C. above the softening point, during which they undergo post-foaming. The particles are then allowed to shrink back to from about 50 to 90% of the post-foam volume by aging, and are re-treated for a sufficient time at 20° C. or more below the softening point with air or nitrogen under a superatmospheric pressure of from 0.5 to 10 bar, during which they regain their original post-foam volume, and are aged under atmospheric pressure until the pressure in the cells has fully dissipated.

The foam particles obtained by the process of the invention can be welded in molds in a conventional manner to form moldings which have a significantly lower density than those obtained from shrunk particles.

In the Examples, parts are parts by weight.

EXAMPLE 1

100 parts of an ethylene-propylene copolymer (ethylene content 2.3% by weight, softening point 147° C., melt flow index 9.5, mean particle weight 1.2 mg), 22 parts of butane, 224 parts of water and 5 parts of tricalcium phosphate as dispersion aid are heated at 133° C. for 1.2 hours with stirring in a pressure vessel, and subsequently, while the pressure in the reactor is kept constant at 21 bar by re-injecting nitrogen, discharged through a base valve and decompressed. Foam particles having a bulk density of 13 g/dm$^3$ and a mean diameter of 4.5 mm are obtained.

After storage for 24 hours, shrinkage to 68% of the original volume has occurred (bulk density 19 g/dm$^3$).

The shrunk particles are treated for 4 hours at 75° C. with air at a superatmospheric pressure of 1 bar and then decompressed. On subsequent storage at room temperature, the pressure in the cells has fully dissipated after about 1.5 hours. The bulk density is now 14.4 g/dm$^3$.

The particles are now transferred pneumatically into a pre-heated molding chamber, a back pressure of 1.75 bar being maintained in the mold during the transfer. The mold is heated for 8 seconds on both sides using steam at 160° C. The mold is subsequently decompressed, cooled with water and opened, and the molding is removed. The molding has a density of 26 g/dm$^3$ and exhibits excellent welding.

By contrast, a molding produced from the shrunk particles without prior pressure treatment has a density of 36 g/dm$^3$, and welding is unsatisfactory.

EXAMPLE 2

The procedure is as in Example 1, but 24 parts of butane are used as the blowing agent.

The bulk density of the foam particles is 11.5 g/dm$^3$ immediately after preparation, 18.5 g/dm$^3$ after storage for 24 hours, and 12 g/dm$^3$ after pressure treatment and subsequent aging.

The density of the molding prepared from pressure-treated and aged particles is 19 g/dm$^3$.

By comparison, the density of a molding prepared from shrunk particles is 34 g/dm$^3$.

EXAMPLE 3

The procedure is as in Example 1, but the pressure treatment is carried out at 85° C. for 2 hours with a nitrogen superatmospheric pressure of 4 bar.

The bulk density of the pressure-treated and aged particles is 12.5 g/dm$^3$, and the molding density is 20 g/dm$^3$.

EXAMPLE 4

The procedure is as in Example 1, but a propylene-butylene copolymer having a butylene content of 5.4% by weight is used.

The bulk density of the particles is 27 g/dm$^3$ immediately after preparation, and 23.5 g/dm$^3$ after the pressure treatment and aging. The density of the molding is 40.5 g/dm$^3$.

By comparison, the density of a molding prepared from shrunk particles is 54 g/dm$^3$.

EXAMPLE 5

The procedure is as in Example 1. The pressure treatment is carried out for 3 hours at 85° C. using an air superatmospheric pressure of 5 bar. The particles are heated for 8 seconds using steam at 165° C. within 5 minutes of decompression, while the excess pressure in the cells of the particles is still 1.8 bar, during which the particles foam up further to a bulk density of 7 g/dm$^3$. After storage for 24 hours, the particles shrink to a bulk density of 12.5 g/dm$^3$. They are then re-treated for 2 hours at 80° C. with an air superatmospheric pressure of 4 bar, decompressed, and stored at room temperature for 12 hours to dissipate the pressure in the cells.

The moldings prepared therefrom in accordance with Example 1 have a density of 13 g/dm$^3$, and welding is excellent.

EXAMPLE 6

Foam particles having a bulk density of 12.5 g/dm$^3$ are prepared by a procedure similar to that of Example 1 using an ethylene-propylene copolymer having an ethylene content of 2.2% by weight, and 21.5 parts of butane. After storage for 24 hours, the bulk density is 20 g/dm$^3$. After pressure treatment with nitrogen (90° C., 3.5 bar superatmospheric pressure, 2.5 hours) and a storage time at room temperature of 2 hours to dissipate the pressure, moldings (density 22.5 g/dm$^3$) are prepared from the foam particles (bulk density 13.7 g/dm$^3$) in a procedure similar to that of Example 1. The moldings have good edge formation, a smooth surface, high welding quality and a linear shrinkage of less than 0.4%.

After pressure treatment with air at 95° C. (4 bar superatmospheric pressure, 4 hours) and a storage time at room temperature of 3 hours to dissipate the pressure, foam particles having a bulk density of 13.0 g/dm$^3$ are obtained. Moldings of density 20.3 g/dm$^3$ prepared therefrom have good edge formation, a smooth surface, high welding quality and a linear expansion of 0.9%.

Without pressure treatment, only moldings of density 36.2 g/dm$^3$ can be prepared from the shrunk foam particles. These moldings have irregular edge formation, a rough surface, poor welding and a linear shrinkage of greater than 1.5%.

EXAMPLE 7

Foam particles of bulk density 12.7 g/dm$^3$ are prepared by a procedure similar to that of Example 1 using 100 parts of an ethylene-propylene copolymer having an ethylene content of 2.6% by weight, and 20 parts of butane. After storage for 24 hours, the bulk density has increased to 19 g/dm$^3$ due to shrinkage.

Moldings of density 26 g/dm$^3$ prepared from the shrunk particles have irregular edge formation, a sunken surface and a linear shrinkage of 10%.

If the shrunk particles are treated for 4 hours at 90° C. with nitrogen under a superatmospheric pressure of 4 bar, the bulk density drops to 12.8 g/dm$^3$. These particles are subsequently treated (within 5 minutes of the pressure treatment) for 8 seconds with steam at 165° C., during which they foam up further to a bulk density of 7.4 g/dm$^3$. After storage for 12 hours at room temperature, they have re-shrunk to a bulk density of 11 g/dm$^3$. They are then re-treated at 85° C. for 2 hours with nitrogen at a superatmospheric pressure of 4 bar. After storage for 2 hours at room temperature to dissipate the pressure, the bulk density is 7.5 g/dm$^3$. Moldings prepared from these particles have a density of 13 g/dm$^3$, good edge formation, a smooth surface and a linear shrinkage of less than 1%.

We claim:

1. A process for expansion of foam particles of propylene polymers with a bulk density of from 10 to 30 g/l which have been prepared using $C_3$- to $C_5$-hydrocarbons as blowing agents and have been shrunk to from 40 to 95% of their original volume, which comprises treating the shrunk particles for a sufficient time at 20° C. or more below the softening point with air or nitrogen under a superatmospheric pressure of from 0.5 to 10 bar, subsequently decompressing the particles to atmospheric pressure, during which they regain their original volume, and aging the particles under atmospheric pressure until the pressure in the cells has fully dissipated.

2. A process as claimed in claim 1, wherein the particles are briefly heated, before the stage of aging under atmospheric pressure, while the excess pressure in the cells is 0.25 bar or more, to a temperature above the softening point, during which they undergo post-foaming, and, after they have shrunk back to from about 50 to 90% of the post-foam volume by aging, are re-treated for a sufficient time at 20° C. or more below the softening point with air or nitrogen under a superatmospheric pressure of from 0.5 to 10 bar, decompressed again, during which they regain their original post-foam volume, and aged under atmospheric pressure until the pressure in the cells has fully dissipated.

* * * * *